United States Patent [19]
Enomoto

[11] Patent Number: 5,541,693
[45] Date of Patent: Jul. 30, 1996

[54] BLUR CORRECTING APPARATUS AND METHOD FOR A CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 313,578

[22] Filed: Sep. 27, 1994

[30]  Foreign Application Priority Data

Sep. 28, 1993  [JP]  Japan ................... 5-241470

[51] Int. Cl.⁶ .................................................. G03B 5/00
[52] U.S. Cl. ............................................ 354/202; 354/430
[58] Field of Search ........................... 354/70, 202, 400, 354/430; 348/208

[56]            References Cited

U.S. PATENT DOCUMENTS

| | | |
|---|---|---|
| 4,996,545 | 2/1991 | Enomoto et al. . |
| 5,039,211 | 8/1991 | Maruyama . |
| 5,150,150 | 9/1992 | Enomoto . |
| 5,153,633 | 10/1992 | Otani .................................. 354/430 |
| 5,172,150 | 12/1992 | Teramoto et al. ................... 354/202 |
| 5,280,387 | 1/1994 | Maruyama . |
| 5,305,040 | 4/1994 | Enomoto . |
| 5,389,997 | 2/1995 | Ohishi .................................. 354/430 |
| 5,416,558 | 5/1995 | Katayama et al. ................... 354/430 |

FOREIGN PATENT DOCUMENTS

| | | |
|---|---|---|
| 62-44707 | 2/1987 | Japan . |
| 63-158518 | 7/1988 | Japan . |
| 2157732 | 6/1990 | Japan . |
| 6-35022 | 2/1994 | Japan . |

*Primary Examiner*—A. A. Mathews
*Attorney, Agent, or Firm*—Greenblum & Bernstein

[57]            ABSTRACT

A blur correcting apparatus of a camera having a photographing lens system, in which a blur correcting optical element is provided on an optical axis of the photographing lens system. The blur correcting optical element is movable in a direction normal to the optical axis. A camera shake detecting sensor detects an angular acceleration applied to the camera. A blur correcting optical element mover moves the blur correcting optical element so that an object image formed on a focal plane by the photographing optical system will not move with respect to the focal plane, in accordance with an output of the camera shake detecting sensor. The blur correcting optical element mover moves the blur correcting optical element in a first step and a second step, the first step being executed after a shutter release switch is pressed and before the shutter is actuated, and the second step being executed while the shutter is actuated.

10 Claims, 7 Drawing Sheets

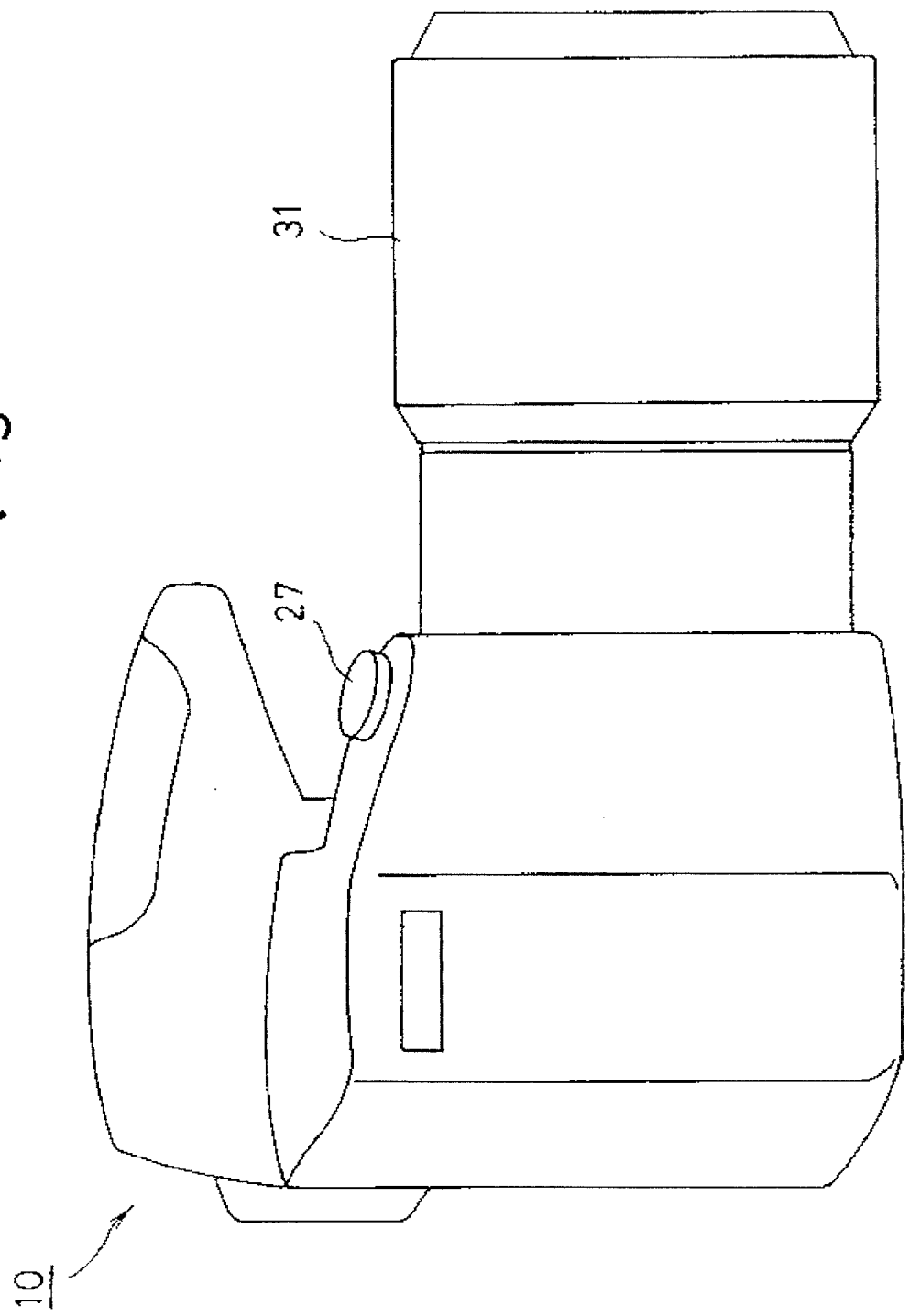

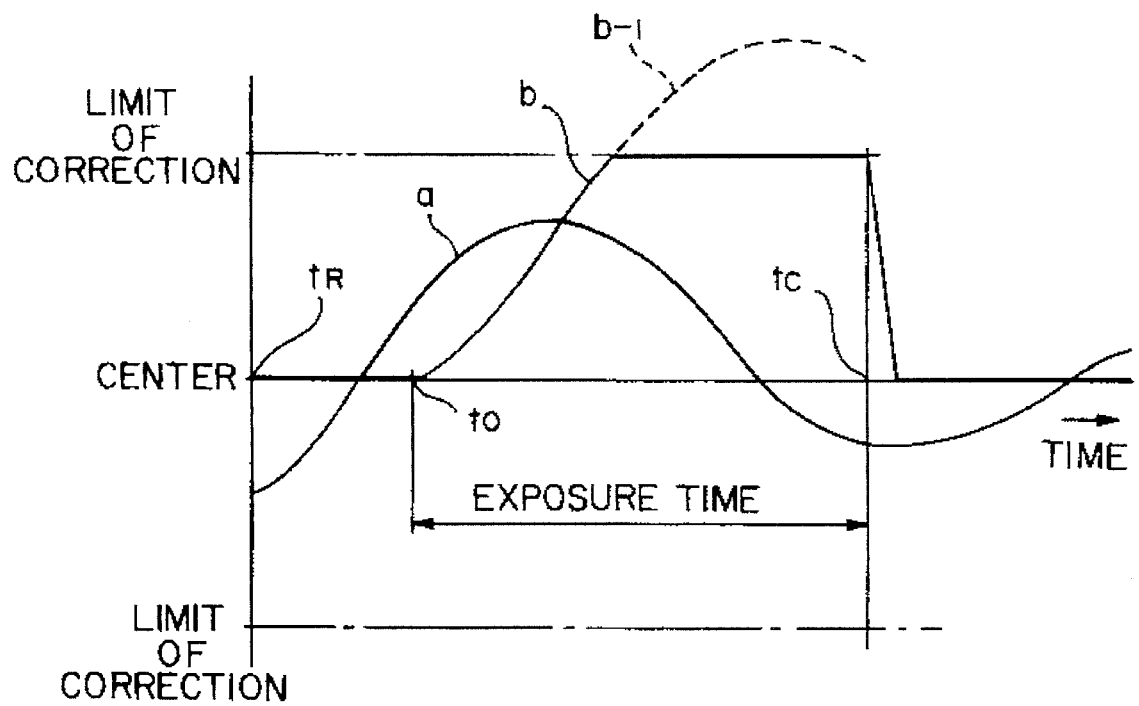

BLUR CORRECTING APPARATUS AND METHOD FOR A CAMERA

BACKGROUND OF THE INVENTION

1. Field of the Invention

The present invention relates to a blur correcting apparatus of a camera in which a blur correcting optical system is moved in a direction to reduce or eliminate a blur of an image in accordance with an output of a blur detector which detects the degree of blur caused by a camera-shake.

2. Description of Related Art

When a picture is taken by a camera which is held by a photographer hand or hands, if the photographer fails to stably or firmly hold the camera or takes a picture while moving or if an image of a dark object is taken at a slow shutter speed, the taken image tends to be blurred due to an accidental displacement of the optical axis of a photographing optical system, caused by a camera-shake, etc. during the period when the film is exposed. The resultant blurred image is dim and indistinct. The image blur can be attenuated to some extent. One hardware solution, is to use a bright lens or increase the film sensitivity to allow an increase in the shutter speed. A software solution would be to improve the photographer's skill at holding the camera more steady while taking the photograph.

To prevent the occurrence of the image blur, it is known that a camera can be provided with a blur correcting lens which is moved in a given direction to eliminate the image blur in accordance with an angular velocity (or angular acceleration) of the camera that represents the displacement of the optical axis of the photographing optical system caused by the camera-shake, using an angular velocity sensor (or angular acceleration sensor) of a camera, for example as proposed in Japanese Patent Application No. 4-192021 or Japanese Unexamined Patent Publication No. 62-44707). Namely, in this solution, the image is intentionally moved on a film surface in a direction opposite to the direction of the movement caused by the camera-shake to cancel the movement to eliminate the image blur.

In order to incorporate such a known blur correcting apparatus in a compact camera for example, it is necessary to realize a simple, compact and inexpensive structure of a blur correcting apparatus. However, if the camera or the blur correcting apparatus is to be made small, the correctable range of blur is inevitably reduced. Accordingly, if the shutter speed is set to be a slow speed or considerable camera-shake takes place, the correctable range of blur is sometimes too narrow to eliminate the blur.

SUMMARY OF THE INVENTION

It is an object of the present invention to provide a blur correcting apparatus in which a correctable range of blur can be effectively utilized and a blur correcting optical system can be quickly and correctly moved in accordance with the degree of camera-shake.

To achieve the object mentioned above, according to one aspect of the present invention, there is provided a blur correcting apparatus of a camera having a photographing lens, comprising a blur correcting optical element which is provided in an optical axis of the photographing optical system and which is movable in a plane normal to the optical axis. A camera shake detecting sensor which detects an angular acceleration applied to the camera, and a mechanism for moving the blur correcting optical element so that an object image formed on a focal plane by the photographing optical system is stationary with respect to the focal plane, in accordance with an output of the camera shake detecting sensor are also provided. The moving mechanism moves the blur correcting optical element in a first and second step, the first step being executed after a shutter release switch is depressed and before a shutter is actuated, and the second step being executed when the shutter is actuated.

According to another aspect of the present invention, there is provided a blur correcting method of a camera having a photographing lens optical system, a blur correcting optical element which is provided on an optical axis of the photographing lens optical system and which is movable in a direction normal to the optical axis. A camera shake detecting sensor which detects an angular acceleration applied to the camera and a mechanism for moving the blur correcting optical element so that an object image formed on a focal plane by the photographing optical system is stationary with respect to the focal plane, in accordance with an output of the camera shake detecting sensor are also provided. The method comprises the steps of: moving the blur correcting optical element in a direction opposite to a direction that is necessary to correct the blur after a shutter release switch is depressed and before a shutter is moved, and moving the blur correcting optical element, from a position that is resulted from the first step, in a direction that is necessary to correct the blur during the shutter movement.

The present disclosure relates to subject matter contained in Japanese patent application No. 5-241470 (filed on Sep. 28, 1993) which is expressly incorporated herein by reference in its entirety.

BRIEF DESCRIPTION OF THE DRAWINGS

The invention will be described below in detail with reference to the accompanying drawings, in which:

FIG. 6 is a side elevational view of a single-lens reflex camera to which a blur correcting apparatus according to the present invention can be applied; and, FIG. 7 is a graph showing a correlation of an output of an angular velocity sensor and a displacement of a blur correcting lens, according to the prior art.

DESCRIPTION OF THE PREFERRED EMBODIMENT

Figure 2:
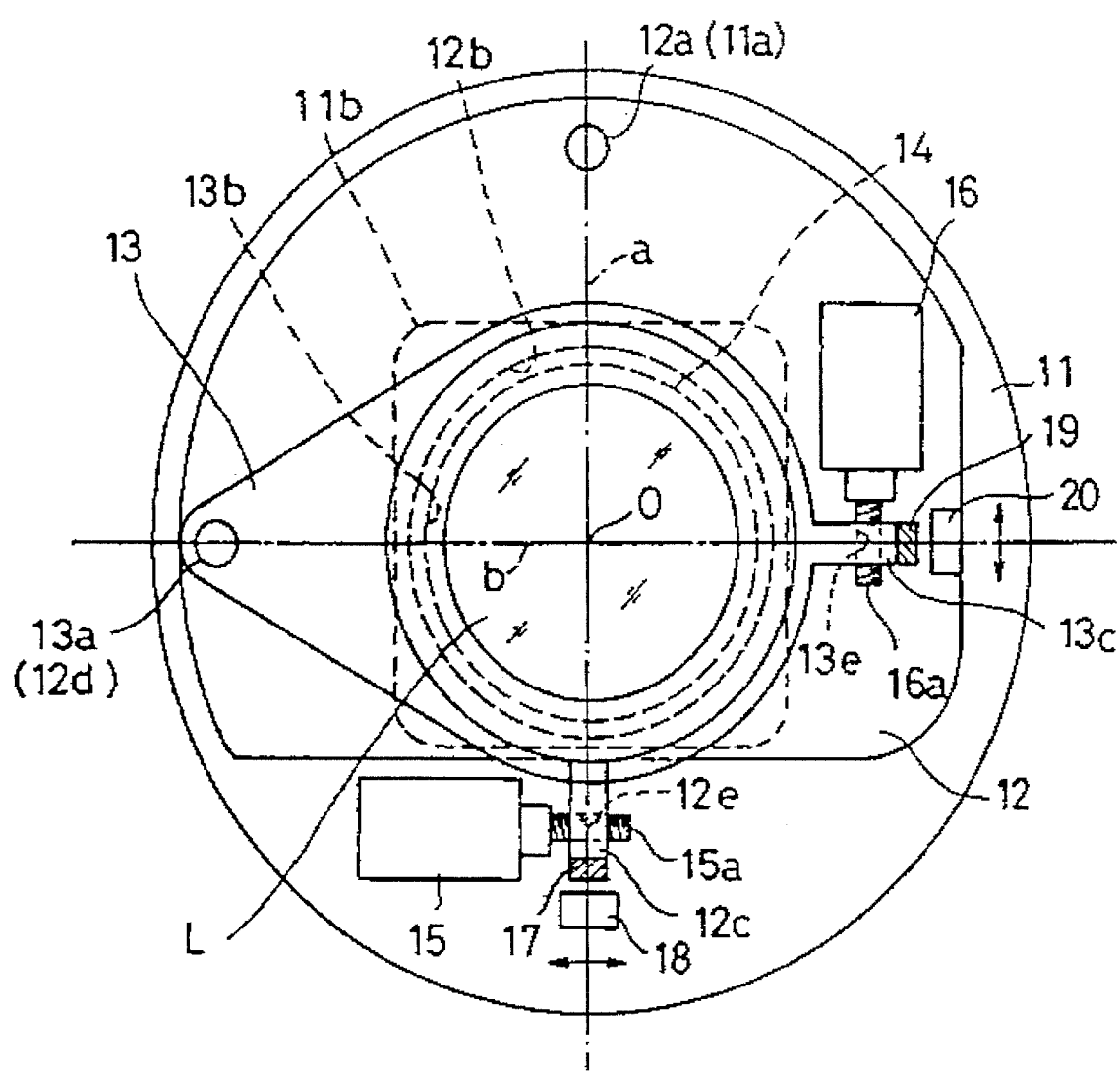
FIG. 2 is a front elevational view of a correcting lens driving mechanism in a blur correcting apparatus according to the present invention.

FIG. 2 shows a blur correcting lens driving apparatus provided in a blur correcting apparatus to which the present invention is applied. The blur correcting lens driving apparatus is provided in a camera 10 (FIG. 6) between a picture taking lens system 31 which is detachably attached to the camera 10 and a film or an image pickup element (not shown) which is located at an image forming position at which an image of an object to be taken is formed by the picture taking lens system 31.

Figure 3:
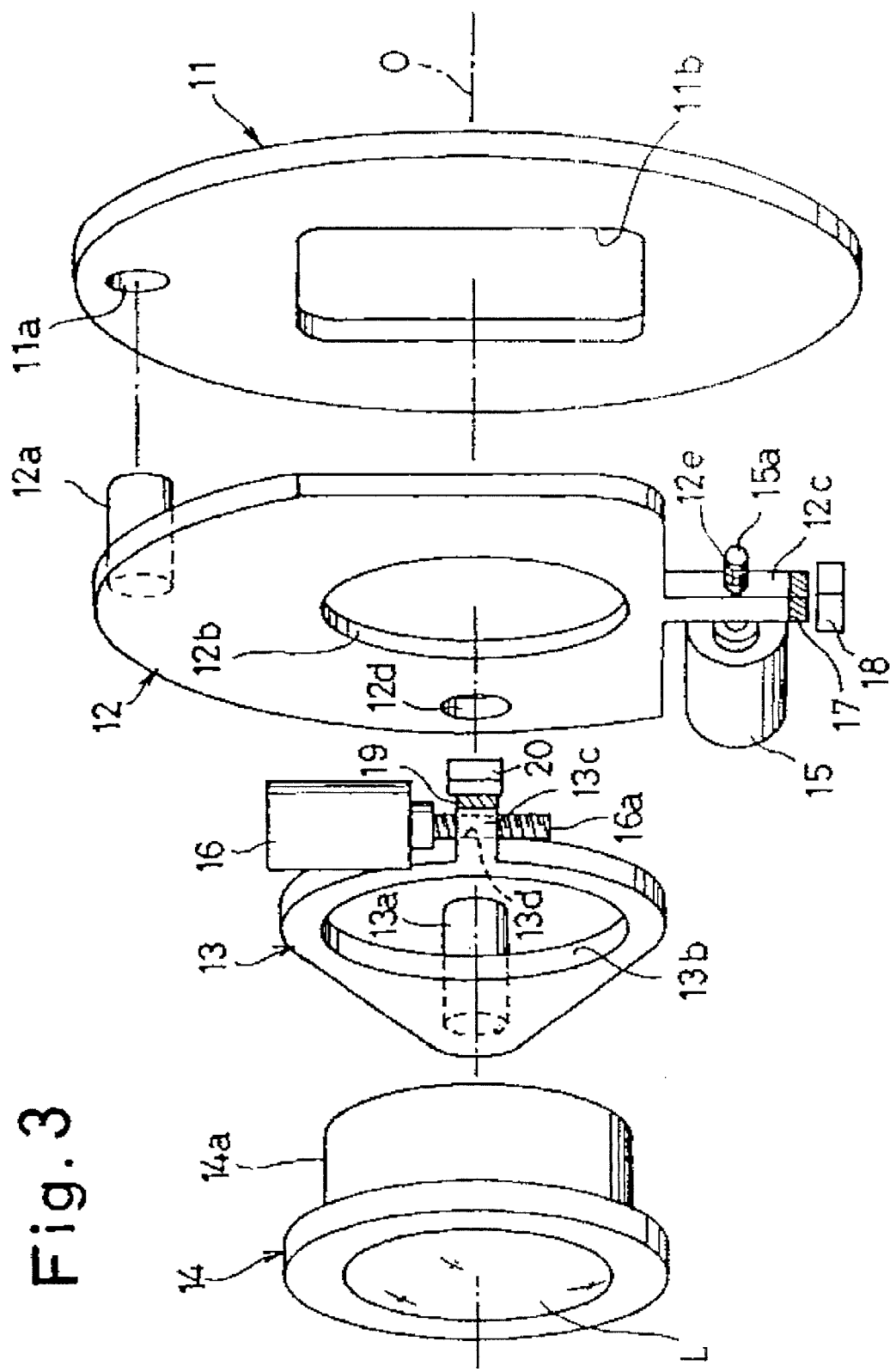
FIG. 3 is an exploded isometric view of a correcting lens driving mechanism in a blur correcting apparatus, according to the present invention.

In FIGS. 2 and 3, "L" designates a blur correcting lens. This blur correcting lens L is driven to move in an opposite direction to a direction of a camera shake to prevent movement of the image on the film plane.

A supporting substrate 11 comprises a disk-shaped member which supports the blur correcting lens L. The supporting substrate 11 is provided thereon with a first hole 11a and a center opening 11b whose center is located on an optical axis O of the taking lens 31. The first hole 11a is offset from the optical axis O outside the center opening 11b. The axis of the first hole 11a extends parallel to the optical axis O. The supporting substrate 11 is secured to an immovable part of the picture taking lens system 31, such as an outer lens barrel (not shown) of the picture taking lens system 31, or a camera body of the camera.

A first rotary disk 12 has a first rotating shaft 12a which is provided in the vicinity of the outer peripheral edge thereof and rotatably fitted in the first hole 11a of the supporting substrate 11. Consequently, the first rotary disk 12 is rotatable about the axis of the first rotating shaft 12a within a plane perpendicular to the optical axis O. The first rotary disk 12 is provided with a circular opening 12b with a center which is substantially coaxial to the optical axis O, a driving arm 12c which is located on the side opposite to the rotating shaft 12a with respect to the optical axis O, and a second hole 12d.

A second hole 12d is formed in a manner such that the second hole 12d is placed on a straight line "b" and is offset from and parallel to the optical axis O when a straight line "a" is made coincident with a vertical direction. The straight line "a" is a line on which the first rotating shaft 12a (or the first hole 11a) and the driving arm 12c are located. The straight line "b" is a line which intersects the optical axis O and falls at right angles with the straight line "a" on the first rotary disk 12. The driving arm 12c is provided with a female screw 12e. This female screw 12e is formed in a manner such that the axis of the female screw 12e extends in a direction perpendicular to the straight line "a" when the first rotary disk 12 is in the state shown in FIG. 2, in which the first rotating shaft 12a and the driving arm 12c are located on the straight line "a".

A second rotary disk 13 has a second rotating shaft 13a which is provided in the vicinity of the outer peripheral edge thereof and rotatably fitted in the second hole 12d of the first rotary disk 12. Consequently, the second rotary disk 13 is rotatable about the axis of the second rotating shaft 13a within a plane perpendicular to the optical axis O. The second rotary disk 13 is provided with a center circular opening 13b with a center which is substantially coaxial to the optical axis O, and a driving arm 13c which is located on the side opposite to the second rotating shaft 13a with respect to the optical axis O.

The driving arm 13c is provided with a female screw 13e. The female screw 13e is formed such that the female screw 13e extends in a direction perpendicular to the straight line "b" when the second rotating shaft 13a and the driving arm 13c are located on the straight line "b". A blur correcting lens frame 14 supports a blur correcting lens L and has a barrel portion 14a whose center axis is coaxial to the optical axis O. The barrel portion 14a is fitted in and secured to the circular opening 13b. Namely, the blur correcting lens frame 14 is supported by the supporting substrate 11 through the second rotary disk 13 and the first rotary disk 12.

The barrel portion 14a is loosely fitted in the center opening 12b of the first rotary disk 12 and the center opening 11b of the supporting substrate 11, so that the blur correcting lens frame 14 is movable (rotatable) through a predetermined angular displacement about the axes of the second and first rotating shafts 13a and 12a. Namely, the inner diameter of the center opening 12b of the first rotary disk 12 is made slightly larger than the outer diameter of the barrel portion 14a so that the second rotary disk 13 can be rotated through a small angular displacement (e.g., a few millimeters) about the axis of the rotating shaft 13a (axis of the second hole 12d).

The supporting substrate 11 is provided thereon with a first driving motor 15 having a driving screw shaft 15a which is engaged with the female screw 12e of the driving arm 12c. The driving screw shaft 15a extends perpendicular to the straight line "a". The first rotary disk 12 is provided with a second driving motor 16 having a driving screw shaft 16a which is engaged with the female screw 13e of the driving arm 13c. The driving screw shaft 16a extends perpendicular to the straight line "b". With this structure, when the screw shafts 15a and 16a are rotated, the first and second rotary disks 12 and 13 can be rotated about the axes of the first rotating shaft 12a (first hole 11a) and the second rotating shaft 13a (second hole 12d), respectively.

Strictly speaking, when the rotation of the first or second rotary disks 12 and 13 takes place, the screw shafts 15a, 16a and the corresponding female screws 12e, 13e of the driving arms 12c and 13c are not exactly aligned. This is however negligible when the angular displacement of the driving arms 12c and 13c is small with respect to the radius of rotational movement. On the other hand, if the angular displacements of the driving arms 12c and 13c are large, the motors 15 and 16 are preferably mounted to the rotary disks 12 and 13 through pivot shafts, or flexible joints (not shown) are preferably provided between the drive shafts of the motors 15, 16 and the screw shafts 15a, 16a to absorb the angular displacements of the driving arms 12c and 13c, respectively.

As mentioned above, the blur correcting apparatus as constructed above is provided between the picture taking lens system 31 and a film or an image pickup element (not shown) which is located at an image forming position at which an image of an object to be taken is formed by the picture taking lens system. Furthermore, the blur correcting apparatus is placed, for example, in a manner such that the straight lines "a" and "b" are identical to the vertical and horizontal axes, respectively.

When the first driving motor 15 is actuated with an output which corresponds to the direction and magnitude of the horizontal component of the camera shake (movement of the optical axis of the taking lens) to rotate the first screw shaft 15a of the first driving motor 15, the first rotary disk 12 and accordingly the blur correcting lens L are rotated about the axis of the first rotating shaft 12a through the driving arm 12c in a direction to cancel the horizontal component of the camera shake (blur). Namely, since the second rotary disk 13 to which the blur correcting lens L is secured is supported on the first rotary disk 12, the blur correcting lens L is moved together with the first rotary disk 12 in the horizontal direction.

Similarly, when the second driving motor 16 is actuated with an output which corresponds to the direction and magnitude of the vertical component of the camera shake (movement of the optical axis of the taking lens) to rotate the second screw shaft 16a of the second driving motor 16, the second rotary disk 13 and accordingly the blur correcting lens L are rotated about the axis of the second rotating shaft 13a through the driving arm 13c in a direction to cancel the vertical component of the camera shake (blur). The movement of the second rotary disk 13 (blur correcting lens L) occurs within the center opening 12b of the first rotary disk 12 without moving the first rotary disk 12.

Figure 1:
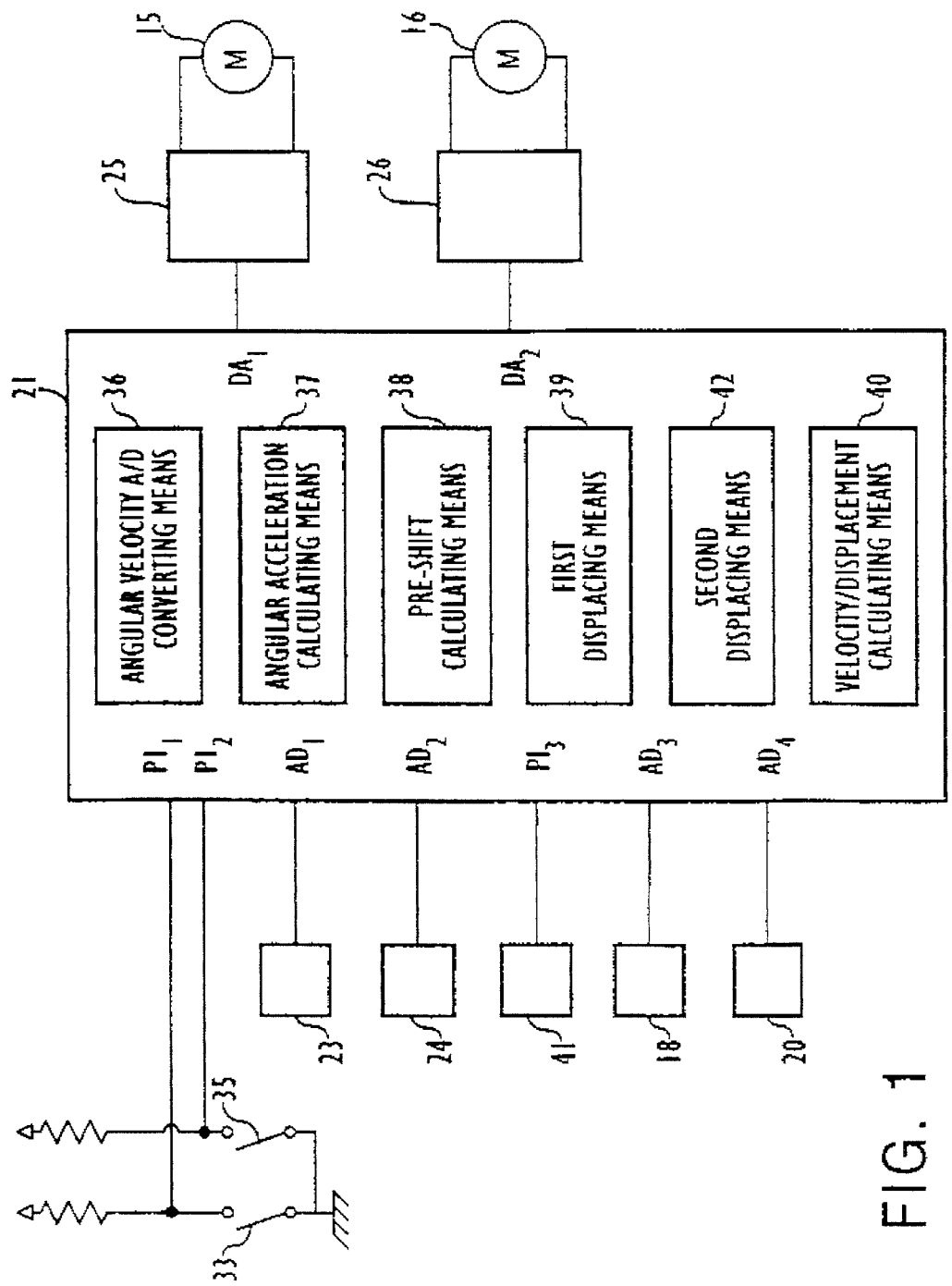
FIG. 1 is a block diagram of a circuit of a blur correcting apparatus according to the present invention.

The driving arms 12c and 13c are provided at the ends thereof with permanent magnets 17 and 19, respectively. An M.R. (i.e., magneto resistance) sensor 18 is fixed to the supporting substrate 11 on the portion of the surface facing to the permanent magnet 17. An M.R. sensor 20 similar to the M.R. sensor 18 is fixed to the first rotary disk 12 on the portion of the surface facing the permanent magnet 19. The M.R. sensors 18 and 20 vary their outputs in accordance with the positions of the permanent magnets 17, 19 and also the positions of their magnetic poles, respectively. When the blur correcting lens L is located at the center of a blur correctable range, the outputs of the M.R. sensors 18 and 20 become zero volt. The M.R. sensors 18, 20 and the permanent magnets 17, 19 constitute a position detecting device which detects the center of the blur correctable range of the blur correcting lens L and also the deviation amount of the blur correcting lens L from the above center The camera 10, which includes the blur correcting apparatus of the present invention, is provided with angular velocity detecting sensors 23 and 24 as shown in FIG. 1 which detect an angular velocity ω. The first and second driving motors 15 and 16 are controlled to move the blur correcting lens L in order to prevent an image on a film plane from blurring in accordance with the outputs of the angular velocity detecting sensors 23 and 24. A controlling system which controls the first and second driving motors 15 and 16 will be discussed below in detail in accordance with the block diagram shown in FIG. 1.

CPU 21 shown in FIG. 1 accomplishes the calculation and control for the operation of a shutter (not shown), a diaphragm and a film winding device, etc., as well as the control for the blur correcting operation. A photometering switch 33 and a release switch 35 are connected to input ports PI1 and PI2 of CPU 21. The Input port PI3 of the CPU 21 is connected to a mirror movement detecting means 41 which detects the completion of an upward or downward movement of a quick-return mirror (not shown). The photometering switch 33 and the release switch 35 are associated with a release button 27 (FIG. 6) of the camera 10, so that when the release button 27 is depressed by a half step, the photometering switch 33 is turned ON, and when the release button 27 is fully depressed, the release switch 35 is turned ON.

Angular velocity sensors 23 and 24 are connected to A/D conversion input terminals AD1 and AD2 of the CPU 21 to detect the angular velocity (ω) in two different directions, that represent a variation of angular position per unit time. MR sensors 18 and 20 are connected to A/D conversion input terminals AD3 and AD4 of the CPU 21. D/A conversion input terminals DA1 and DA2 of the CPU 21 are connected to motor driving amplifiers 25 and 26 which amplify the outputs of the input terminals DA1 and DA2 to drive first and second correcting motors 15 and 16, respectively.

The CPU 21 further includes an angular velocity A/D converting mechanism 36, an angular acceleration calculating mechanism 37, a pre-shift calculating mechanism (first calculating mechanism) 38, a first displacing mechanism, a second displacing mechanism 42, and a velocity/displacement calculating mechanism (second calculating mechanism) 40.

The angular velocity A/D converting mechanism 36 converts the outputs (analog data) of the angular velocity sensors 23 and 24 to digital data at a predetermined time, upon detecting the completion of the upward movement of the quick-return mirror by the mirror movement detecting mechanism 41 and outputs values Dh1, Dv1, Dh2, and Dv2 of the angular velocity.

The angular acceleration calculating mechanism 37 calculates the angular velocities Dh1, Dv1, Dh2, and Dv2 output from the angular velocity A/D converting mechanism 36 and outputs values Ah and Av of the angular acceleration.

The pre-shift calculating mechanism 38 calculates and outputs amounts of shift (displacement) Sh, Sv and a shift direction (displacement) by which the correcting lens L is to be moved in advance in a direction substantially opposite to the direction of a correction of a blur, prior to the commencement of the correction of the blur, in accordance with the outputs of the angular velocity sensors 23 and 24, i.e., the angular velocities Dh2, Dv2 and the angular accelerations Ah, Av output from the angular velocity A/D converting mechanism 36 and the angular acceleration calculating mechanism 37, respectively, after the shutter release is actuated and before the shutter blades are moved.

The first displacing mechanism 39 compares the displacements Sh, Sv output from the pre-shift calculating mechanism 28 with the displacement of the correcting lens L based on the detection results of the MR sensors 18 and 20 and stops the operation of the first and second correcting motors 15 and 16 when the displacements Sh, Sv are equal to the displacement of the correcting lens L to move the correcting lens L to a blur correction commencement position.

The velocity/displacement calculating mechanism 40 calculates and outputs the speed, displacement, and direction of the movement of the correcting lens L for the correction of the blur in accordance with the angular velocities Dh2, Dv2 and the angular accelerations Ah, Av output from the angular velocity A/D converting mechanism 36 and the angular acceleration calculating mechanism 37, respectively.

The second displacing mechanism 42 compares the displacement of the correcting lens L necessary to correct the blur, obtained by and output from the velocity/displacement velocity/displacement calculating mechanism 40, with the displacement of the correcting lens L determined based on the detection results of the MR sensors 18, 20 at the commencement of the movement of the shutter blades. The second displacing mechanism 42 drives the first and second correcting motors 15 and 16 until the two displacements are equal.

Figure 5:
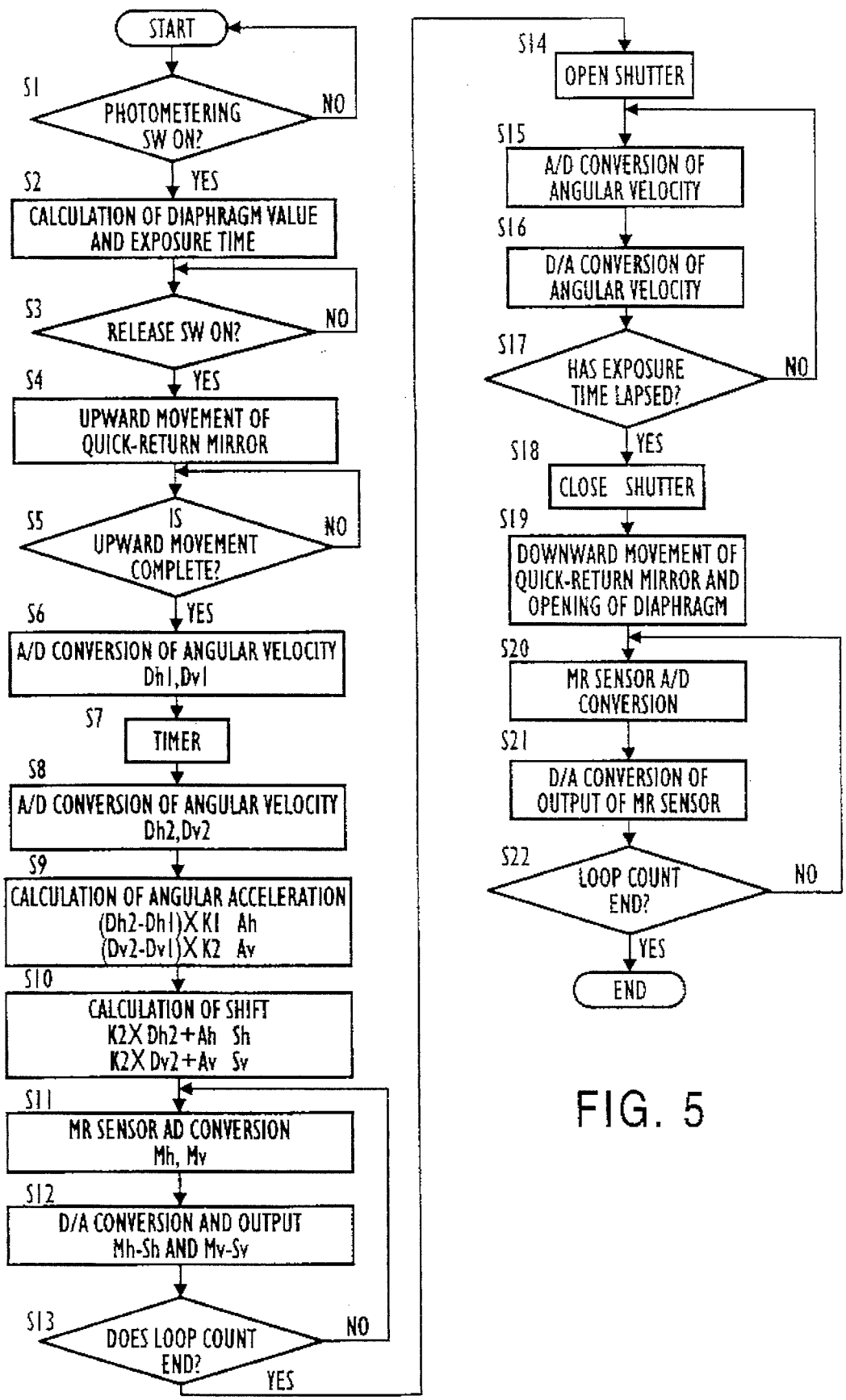
FIG. 5 is a flow chart of an operation of a blur correcting apparatus of a camera, according to the present invention.

The operation of the blur correcting apparatus of the present invention will be described below with reference to a flow chart shown in FIG. 5.

When the release button 27 is depressed by a half step to actuate the photometering switch 33, after the main power switch of the camera body 11 is turned ON, the CPU 21 calculates the diaphragm value and the exposure time in accordance with the measurements of the photometer (steps S1, S2).

Thereafter, when the release button 27 is fully depressed to actuate the release switch 35, the stop-down of a diaphragm (not shown) of the photographing lens 31 and the upward movement of the quick-return mirror within the camera body are effected (steps S3, S4). The time in which the upward movement of the quick-return mirror is completed is usually around several tens of milliseconds.

When the completion of the upward movement of the quick return mirror is detected by the mirror movement detecting mechanism 41, the angular velocity A/D converting mechanism 36 converts the outputs of the angular velocity sensors 23 and 24 in different directions at the front and rear stages of the timer routine and outputs the angular velocities Dh1, Dv1, Dh2, and Dv2 thus obtained (steps S5 through S8).

Thereafter, at step S9, the angular acceleration calculating mechanism 37 calculates and outputs the angular acceleration values Ah and Av, using the angular velocities Dh1, Dv1, Dh2, and Dv2, based on the following equations;

$$(Dh2-Dh1) \times K1,$$

$$(Dv2-Dv1) \times K1,$$

wherein "K1" designates a constant of proportionality. At step S10, the pre-shift calculating mechanism 38 calculates and outputs the displacements Sh, Sv of the correcting lens L to be shifted and the direction thereof, using the angular velocities Dh2 and Dv2 and the angular acceleration values Ah and Av, based on the following equations:

$$K2 \times Dh2 + Ah;$$

$$K2 \times Dv2 + Av,$$

wherein "K2" designates a constant of proportionality. As a result, the first displacing mechanism 39 moves the correcting lens L in a predetermined direction, while comparing the amounts of pre-shift Sh, Sv output from the pre-shift calculating mechanism 28 and the displacements corresponding to the digital values Mh, Mv which are obtained by converting the outputs of the MR sensors 18 and 20. When the amounts of pre-shift and the displacements corresponding to the digital values Mh, Mv are identical, the first and second correcting motors 15 and 16 are stopped. Namely, the difference between the converted values Mh and Sh from the MR sensor 18 is output from the D/A conversion output terminal DA1 to the motor driving amplifier 25. Similarly, the difference between the converted values Mv and Sv from the MR sensor 20 is output from the DA conversion output terminal DA2 to the motor driving amplifier 26. Consequently, the first and second correcting motors 15 and 16 are driven by the angular displacements corresponding to the respective differences to move the correcting lens L by the amounts of pre-shift Sh, Sv (step S12). Therefore, the correcting lens L is moved to a position in which there is no difference between the amounts of pre-shift Sh, Sv and the converted values Mh, Mv, determined in accordance with the digital values of the angular velocities Dh2, Dv2 and angular accelerations Ah, Av of the angular velocity sensors 23, 24, converted at steps S6 through S9. Steps S11, S12 and S13 compare the actual position of the correcting lens L with the requested position and move the lens towards the requested position. Each loop of S11, S12, S13 brings the correcting lens L closer to the requested position. If the number of loops exceeds the value set by counter S13, then the operation moves to step S14. If the lens L is moved to the actual position before finishing the number of loops set by the counter S13 then the operation moves to step S14. Thereafter, if the front curtain of the shutter begins moving, the output values of the angular velocity sensors 23 and 24 in their respective directions are converted to digital values. The converted values thus obtained are multiplied by an appropriate factor of proportionality and are output to the motor driving amplifiers 25 and 26 through the D/A conversion output terminals DA1 and DA2 (steps S14 through S16). The A/D conversion of the angular velocity at step S15 and the D/A conversion and outputting of the angular velocity at step S16 are repeated until the exposure time determined at step S2 lapses. During this period, the correcting motors 15 and 16 are respectively rotated at speeds corresponding to the outputs of the angular velocity sensors 23 and 24, depending on the degree of the camera-shake to move the correcting lens L in a predetermined direction to thereby reduce or eliminate the image blur. The correcting motors 15 and 16 are stopped by the second displacing mechanism 40.

After the lapse of the exposure time, if the movement of the rear curtain of the shutter is completed to close the shutter, the downward movement of the quick-return mirror to an initial position takes place, and the diaphragm is returned to an open position (steps S17 through S19). Consequently, the correcting motors 15 and 16 move the correcting lens L until the outputs of the MR sensors 18 and 20 are zero. As a result, the correcting lens L is returned to an initial center position. Thus, the above-mentioned sequential operations are completed (steps S20 through S22).

Figure 4:
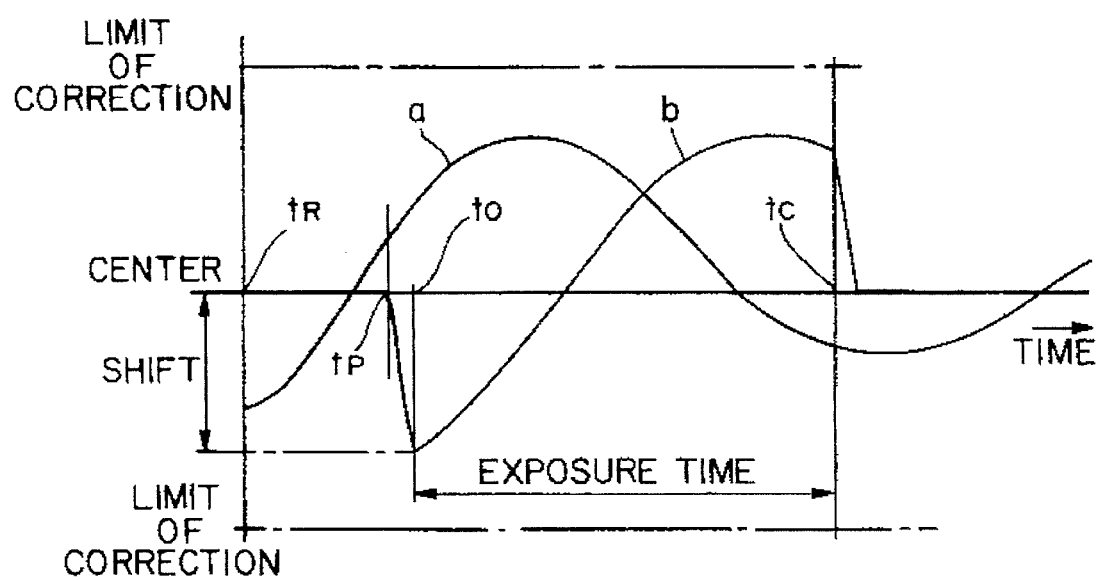
FIG. 4 is a graph showing a correlation of an output of an angular velocity sensor and a displacement of a blur correcting lens, according to the present invention.

The following discussion will be addressed to a correlation between the outputs of the angular velocity sensors 18, 20 and the displacement of the correcting lens L (see FIGS. 4 and 7). FIG. 7 shows the prior art and FIG. 4 shows the present invention.

For clarity, the discussion will be applied only to the horizontal direction or vertical direction.

In FIGS. 4 and 7, the waves "a" designate the outputs of the angular velocity sensors 23, 24, i.e., the angular velocities of the displacement of the optical axis due to the camera-shake, the waves "b" designate the output of the MR sensor, i.e., the positions of the correcting lens L. The correcting lens L is moved by the first and second correcting motors 15 and 16 to which the voltages proportional to the outputs of the angular velocity sensors 23, 24 are applied. Therefore, the wave "b" is obtained by integrating the wave "a".

In FIGS. 4 and 7, the release switch 35 is turned ON at time "$t_R$", and the shutter is opened and closed at times "$t_O$" and "$t_C$", respectively. In FIG. 7, since the correcting lens L begins moving without a pre-shift as soon as the shutter is opened, the correcting lens L which should continue moving along the phantom curve indicated by $b_{-1}$ cannot move beyond the limit of correction. In FIG. 4, the value and inclination angle of the wave "a" at the time "$t_P$" immediately before the opening of the shutter, that is, the angular velocities Dh1, Dv1, Dh2 and Dv2 that are output values of the angular velocity sensors 23 and 24 and the angular accelerations Ah and Av are obtained. Consequently, the pre-shift (pre-displacement) is calculated based on the angular velocities Dh1, Dv1, Dh2 and Dv2 and the angular accelerations Ah and Av, so that the correcting lens L is pre-shifted before the shutter is opened at time "$t_O$". As a result if the camera-shake occurs, the movement of the correcting lens L is certainly restricted within the limit of correction to thereby effectively correct the blurred image.

Note that the blur detectors are not limited to the angular velocity sensors 23 and 24 in the illustrated embodiment. Namely, the angular acceleration sensors can be equally used as the blur detectors.

As can be seen from the above discussion, according to the present invention, the range of correction of the blurred image can be effectively used, so that the correcting optical system can be quickly and correctly moved in accordance with the degree of camera-shake.

I claim:

1. A blur correcting apparatus of a camera having a photographing lens, comprising:

a blur correcting optical element provided in an optical axis of a photographing optical system and movable in a plane normal to said optical axis;

a camera shake detecting sensor for detecting an angular acceleration applied to said camera;

means for calculating an amount and a direction of a pre-shift of said blur correcting optical element in accordance with said detected angular acceleration, and means for moving said blur correcting optical element so that an image formed on a focal plane by said photographing optical system is stationary with respect to said focal plane, in accordance with an output of said camera shake detecting sensor;

wherein said moving mechanism move said blur correcting optical element in a first and second step, said first step being executed, in accordance with an output of said calculating means, after a shutter release switch is depressed and before a shutter is actuated, and said second step being executed during actuation of said shutter.

2. The blur correcting apparatus of a camera according to claim 1, wherein said moving means moves said blur correcting optical element in said first step in a direction different than in said second step.

3. The blur correcting apparatus of said camera according to claim 1, said calculating means comprising first calculating means for calculating said amount of said pre-shift and said direction of said pre-shift of said blur correcting optical element which is to be pre-shifted prior to a movement in a direction opposite to a direction that is necessary to correct a blur;

said blur correcting apparatus further comprising:

second calculating means for calculating a displacement and a direction of a displacement of said blur correcting optical element, necessary to correct said blur;

first displacing means for moving said blur correcting optical element to a blur correction commencement position in which said blur correcting optical element commences a correction of said blur in accordance with outputs of said first calculating means, after said shutter release switch is depressed and before said shutter is actuated; and second displacing means for moving said blur correcting optical system in accordance with an output of said second calculating means while said shutter is actuated.

4. The blur correcting apparatus of a camera according to claim 1, said pre-shift being a prepatory movement of said blur correction optical element prior to a blur correcting operation.

5. A blur correcting method of a camera having a photographing lens optical system, a blur correcting optical element which is provided on an optical axis of said photographing lens optical system and which is movable in a direction normal to said optical axis, a camera shake detecting sensor for detecting an angular acceleration applied to said camera; and means for moving said blur correcting optical element so that an object image formed on a focal plane by said photographing optical system is stationary with respect to said focal plane, in accordance with an output of said camera shake detecting sensor;

wherein said method comprises the steps of:

calculating an amount of pre-shift of said blur correcting optical element in accordance with said output of said camera shake detecting sensor;

moving said blur correcting optical element in accordance with the calculated amount of pre-shift in an opposite direction to a direction that is necessary to correct a blur after a shutter release switch is depressed and before a shutter is moved; and moving said blur correcting optical element from a position resulting from said second step in a direction that is necessary to correct the blur during said shutter movement.

6. The blur correcting method of a camera according to claim 5, said pre-shift being a prepatory movement of said blur correction optical element prior to a blur correcting operation.

7. A blur correcting apparatus of a focal plane shutter camera including blur detecting mechanism for detecting a blur of an image caused by a camera-shake, and position detecting mechanism for detecting a position of a blur correcting element, comprising;

first calculating mechanism for calculating an amount of a pre-shift and a direction of said pre-shift of said blur correcting optical element which is to be pre-shifted prior to a movement in a direction opposite to a direction necessary to correct said blur of said image, in accordance with an output of said blur detecting means;

second calculating mechanism for calculating a displacement and a direction of a displacement of said blur correcting optical element that is necessary to correct said blur of said image;

first displacing mechanism for moving said blur correcting optical element to a blur correction commencement position in which said blur correcting optical element commences a correction of said blur in accordance with an output of said first calculating mechanism and said position detecting means after a shutter release switch is actuated and before a leading curtain of said focal plane shutter is moved; and, second displacing mechanism for moving said blur correcting optical system in accordance with an output of said second calculating mechanism and said position detecting means after said leading curtain is moved.

8. A blur correcting apparatus of a camera having a photographing lens, comprising:

a blur correcting optical element provided in an optical axis of a photographing optical system and movable in a plane normal to said optical axis;

a camera shake detecting sensor that detects an angular acceleration applied to said camera; and, means for moving said blur correcting optical element so that an image formed on a focal plane by said photographing optical system is stationary with respect to said focal plane, in accordance with an output of said camera shake detecting sensor;

said moving means moves said blur correcting optical element in a first and in a second step, said first step being executed after a shutter release switch is depressed and before a shutter is actuated, and said second step being executed during actuation of said shutter;

means for calculating an amount of a pre-shift and a direction of said pre-shift of said blur correcting optical element, which is to be pre-shifted prior to a movement in a direction opposite to a direction that is necessary to correct a blur, in accordance with an output of said camera shake detecting sensor; and displacing means for moving said blur correcting optical element to a blur correction commencement position in which said blur correcting optical element commences a correction of said blur in accordance with outputs of said calculating means, after said shutter release switch is depressed and before said shutter is actuated.

9. The blur correcting apparatus of said camera according to claim 8, further comprising:

second calculating means for calculating a displacement and a direction of a displacement of said blur correcting optical element, necessary to correct said blur; and second displacing means for moving said blur correcting optical system in accordance with an output of said second calculating means while said shutter is actuated.

10. The blur correcting apparatus of a camera according to claim 8, said pre-shift being a prepatory movement of said blur correction optical element prior to a blur correcting operation.

* * * * *

UNITED STATES PATENT AND TRADEMARK OFFICE
CERTIFICATE OF CORRECTION

PATENT NO. : 5,541,693
DATED : July 30, 1996
INVENTOR(S) : S. ENOMOTO

It is certified that error appears in the above-indentified patent and that said Letters Patent is hereby corrected as shown below:

At column 9, line 14 (claim 1, line 16), change "mechanism" to ---means---.

At column 10, line 16 (claim 7, line 4), change "mechanism" to ---means---.

At column 10, line 18 (claim 7, line 6), change "mechanism" to ---means---.

At column 10, line 25 (claim 7, line 12), change "mechanism" to ---means---.

At column 10, line 29 (claim 7, line 16), change "mechanism" to ---means---.

At column 10, line 33 (claim 7, line 21), change "mechanism" to ---means---.

At column 10, line 37 (claim 7, line 25), change "mechanism" to ---means---.

UNITED STATES PATENT AND TRADEMARK OFFICE
CERTIFICATE OF CORRECTION

PATENT NO. : 5,541,693
DATED : July 30, 1996
INVENTOR(S) : S. ENOMOTO

It is certified that error appears in the above-indentified patent and that said Letters Patent is hereby corrected as shown below:

At column 10, line 39 (claim 7, line 27), change "mechanism" to ---means---.

Signed and Sealed this

Twenty-sixth Day of November 1996

Attest:

BRUCE LEHMAN

*Attesting Officer*    *Commissioner of Patents and Trademarks*